(12) United States Patent
Krishna et al.

(10) Patent No.: US 6,188,496 B1
(45) Date of Patent: Feb. 13, 2001

(54) WIRELESS COMMUNICATION SYSTEM

(75) Inventors: Arvind Krishna, Somers; Mahmoud Naghshineh, Fishkill; Claus Michael Olsen, Cortlandt Manor, all of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 08/977,873

(22) Filed: Nov. 25, 1997

(51) Int. Cl.[7] .............................. H04B 10/02; H04B 10/00
(52) U.S. Cl. ........................ 359/177; 359/174; 359/172
(58) Field of Search ................................ 359/145, 161, 359/164, 174, 176, 177; 375/211, 214, 252, 469

(56) References Cited

U.S. PATENT DOCUMENTS

| 5,289,306 | * | 2/1994 | Hirohashi et al. | 359/174 |
| 5,563,728 | * | 10/1996 | Allen et al. | 359/172 |
| 5,596,313 | * | 1/1997 | Berglund et al. | 340/574 |
| 5,912,752 | * | 6/1999 | Mollett et al. | 359/137 |
| 6,014,236 | * | 1/2000 | Flaherty | 359/118 |

* cited by examiner

*Primary Examiner*—Leslie Pascal
*Assistant Examiner*—Dalzid Singh
(74) *Attorney, Agent, or Firm*—Ratner & Prestia

(57) ABSTRACT

A repeater that has a receiver for receiving a signal. A validation module determines whether a signature is present in the received signal. An invalidation module determines whether undesired signal components are present in the received signal. The received signal is transmitted if the signature is present and if the undesired signal components are not present.

23 Claims, 7 Drawing Sheets

WIRELESS COMMUNICATION SYSTEM

TECHNICAL FIELD

The present invention relates generally to signal regeneration, and more specifically to a physical layer link between wireless devices. In particular, a method and apparatus is disclosed for regenerating an infrared wireless signal for communication between isolated infrared wireless stations.

BACKGROUND OF THE INVENTION

Wireless communication systems are often used where it is preferable not to create a wired link to each communicating station. Wireless communication systems may be used, for example, to communicate between rooms in building.

When a wireless communication system uses infrared (IR) signals as a means for communicating, the distance between two communicating stations is limited. Limiting factors include communication speed and whether the system is diffused or directional. In addition, when IR (infrared) communicating stations are located in different rooms, they may not be able to directly communicate with each other, because IR signals can not propagate through walls. Connectivity between areas that are separated, by walls, for example, may be achieved by using signal regeneration.

Bridges or routers may also be used for transferring IR signals between areas. A bridge or router is a network layer solution. A bridge or router first desirably validates a received frame using information in the frame. The bridge or router then decides whether to retransmit and forward the frame based on the receipt and content of this information. Different criteria and different routing algorithms for forwarding a frame are known to those skilled in the art. This decision making process results in bridges or routers delaying a frame before retransmitting the frame. Another possible source of delay in a bridge or router in retransmitting a signal from one room to another is the time to convert a signal from an IR MAC protocol to a wired MAC protocol and then back to an IR MAC protocol.

Analog or digital repeaters may also be used for IR signal regeneration. A repeater is a physical layer solution that does not implement a routing protocol nor include its associated delays. However, commonly repeaters simply retransmit a received signal without validating the signal before retransmission. This may result in the regeneration of invalid signals.

A wireless communication system 100 having a common wiring infrastructure 105 topology is shown in FIG. 1. Repeaters 112, 122, 132, 142 (generally designated "R") are connected to the common wiring infrastructure 105. A first room 110, a second room 120, a third room 130, and a fourth room 140 are separated by walls 107. A source wire less station 118 may communicate with a destination wireless station 148 by transmitting a wireless signal 116 to the repeater 112 in the first room 110. This transmission may be, for example, an IR signal. The repeater 112 then transmits the received wireless signal 116 onto the common wiring infrastructure 105. From common wiring infrastructure 105, signal 116 may be distributed to repeater 122 in Room 2, repeater 132 in Room 3 and repeater 142 in Room 4. When repeater 142 in Room 4 receives the retransmitted signal from the common wiring infrastructure 105, wireless signal 146 may be transmitted to destination 148.

Noise and unwanted signals are often present in wireless communication systems. For example, in an IR wireless communication system, thermal noise, sunlight, IR remote control devices, and light from lamps may be sources of IR noise. When the lamp 114 in FIG. 1 is turned on, the IR radiation generated by the lamp 114 may be a source of noise received by the repeater 112.

When a noise source, such as light from the lamp 114, for example, is turned on, the repeater 112 may receive the wireless signal 116 from the source wireless station 118 plus noise from the lamp 114. The noise may cause the repeater 112 to receive a false signal. A conventional physical layer repeater may retransmit the false signal, without checking for undesired signal components, onto the common wiring infrastructure 105. This may result in repeater 122 retransmitting a false signal 126 into the second room 120, repeater 132 retransmitting a false signal 136 into the third room 130, and repeater 142 retransmitting a false signal 146 into the fourth room 140 and to the destination wireless station 148.

Retransmission of a false signal by repeater 112 may inhibit communication of true signals across the common wiring infrastructure 105 between wireless stations 128, 138, 148 in rooms without noise sources. A possible disadvantage of a common wiring infrastructure 105 topology is the cost of the wiring infrastructure. A possible advantage of having a common wiring infrastructure 105 topology is having connectivity between N rooms with only N repeaters.

A wireless communication system 200, having a point-to-point topology is shown in FIG. 2. A repeater 212 in a first room 210 is connected to a repeater 232 in a third room 230 by a wiring 234 through a wall 207. Repeaters 233, 242 are similarly connected between the third room 230 and the fourth room 240. Repeaters 243, 222 are similarly connected between the fourth room 240 and the second room 220.

A source wireless station 218 may communicate with a destination wireless station 248 by transmitting a wireless signal 216 to the repeater 212 in the first room 210. The repeater 212 transmits (i.e., retransmits) the received signal to the repeater 232 in the third room 230 through the wiring 234. The repeater 232 transmits (i.e., retransmits) the received signal by a wireless transmission 236 to the repeater 233. Repeater 233 transmits (i.e., retransmits) the received signal to the repeater 242 which transmits (i.e., retransmits) the signal using a wireless signal 246 to the destination wireless station 248.

A light source such as a lamp 214 may generate noise as described above with reference to lamp 114 in FIG. 1. When a noise source, such as light from the lamp 214, for example, is turned on, an false signal may propagate from repeater 212 to repeater 232. From repeater 232 it may propagate to wireless station 238 and repeater 233, and so on to repeaters 242, 243, 222 and wireless stations 228, 248 in the second room 220 and fourth room 240.

Retransmission of a false signal by repeater 112 may inhibit communication of valid signals between wireless stations 228, 238, 248 in rooms without noise sources. A possible advantage of a point-to-point topology is that a common wiring infrastructure may not be required. A possible disadvantage of a point-to-point topology is that 2*(N−1) repeaters may be required for connectivity between N rooms.

A possible problem when using conventional physical layer repeaters that transmit and receive wireless signals on a single channel is self-distortion. The problem of self-distortion will be described with reference to FIG. 3. Self-distortion may occur due to multiple path reception in a wireless communication system 300.

A source wireless station 318 in a first room 310 may communicate with a destination wireless station 328 in a second room 320 using a repeater 312. The wireless station 318 transmits a wireless signal. The wireless signal following a first signal path 316 is received by the repeater 312. The repeater 312 retransmits the received signal to the repeater 313 which retransmits the signal into room 320. The retransmitted signal following a second signal path 326 is received by the destination wireless station 328. The wireless signal transmitted by the wireless station 318 may additionally follow a third signal path 317. The signal along signal path 317 may reach the destination wireless station 328 through an opening 322 in the wall 307 as shown in FIG. 3. The signal following path 317 may collide with the signal following path 326 from the repeater 313 and may result in a false signal reaching destination wireless station 328. The signals following paths 326 and 317 may collide rather than coincide because of path length delay differences. It is also possible for a similar collision of signals to occur at the repeater 332 in the second room 320.

The self-distortion described above may occur because at least two copies of the same signal are present simultaneously at a single destination because one or more copies of the signal is regenerated and repeated at the physical layer.

SUMMARY OF THE INVENTION

A repeater has a receiver for receiving a signal. A validation module determines whether a signature is present in the received signal. An invalidation module determines whether undesired signal components are present in the received signal. The received signal is transmitted if the signature is present and if the undesired signal components are not present.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 4:
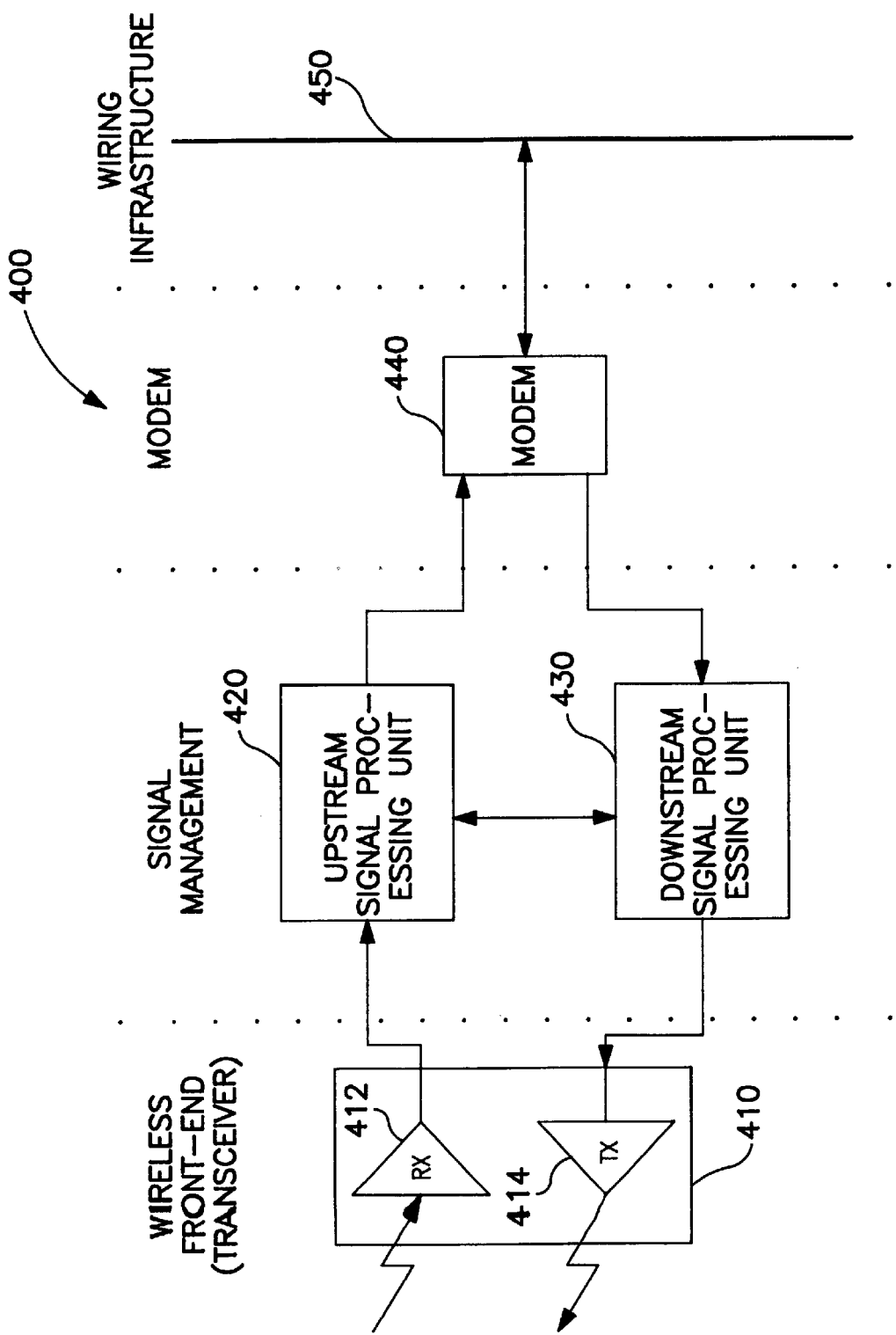
FIG. 4 is a block diagram of a repeater in accordance with an exemplary embodiment of the present invention.

Referring now to the drawing, wherein like reference numerals refer to like elements throughout, FIG. 4 shows a repeater 400 according to an embodiment of the invention. The repeater authenticates a received signal before retransmitting the signal. A transceiver 410 transmits and receives wireless signals from a wireless station. The transceiver 410 includes a receiver 412 and a transmitter 414. A wireless signal is received by the receiver 412 and processed by the upstream signal processing unit 420 to determine whether the received signal is a valid signal. If the received signal is a valid signal, then the upstream signal processing unit 420 forwards the signal to a communication device which, in this exemplary embodiment, is modem 440. Modem 440 properly modulates the signal and transmits the signal on the wiring infrastructure 450.

A signal on the wiring infrastructure 450 is received by the modem 440 and processed by the downstream signal processing unit 430 and retransmitted as a wireless signal by the transmitter 414.

The repeater 400 preferably is a digital repeater to avoid adding signal distortion and jitter to a received signal. It is preferable not to transmit any part of signal that is not authentic. Therefore, in order not to lose part of a transmission, it is desirable to store a received signal while determining whether the signal is a valid signal. The stored portion of a signal may later be transmitted after the signal is determined to be a valid signal.

When the repeater detects a valid signal from the wireless side (i.e., in the upstream signal path), it may block the repeaters transmitter from sending signals to the wireless side, and when the repeater transmitter section detects a signal from the wiring infrastructure (i.e., the downstream signal path), it may block the upstream signal path. In one exemplary embodiment of the present invention, the repeaters receiver only blocks the transmitter if the receiver is not already blocked itself. Similarly, the repeater's transmitter only blocks the receiver if the transmitter is not already blocked itself.

When a signal is received, time may be needed for a repeater to synchronize to the signal. During synchronization, it is possible to lose part of the signal. The repeater according to the present invention may recreate signal components lost during synchronization. In a preferred embodiment, the repeater identifies a timing reference position of a received signal and uses the timing reference position to recreate any lost signal component.

The following description is made assuming a signal received by a repeater according to an exemplary embodiment of the present invention has a modulation format and frame structure as described by Gfeller, F., et al., Advanced Infrared (AIR) IrPHY Draft Physical Layer Specification, IrPHY Proposal Submission 0.3, IrDA Standards Body, October 1997. The modulation format is 4-PPM (Pulse Position Modulation). The proposed frame comprises a preamble followed by a synchronization sequence, a frame body, and a protocol data unit. As described below, this invention utilizes the preamble and synchronization sequence. As known to those skilled in the art, the teachings of this invention may be applied to other frame structures and modulation formats.

Figure 5:
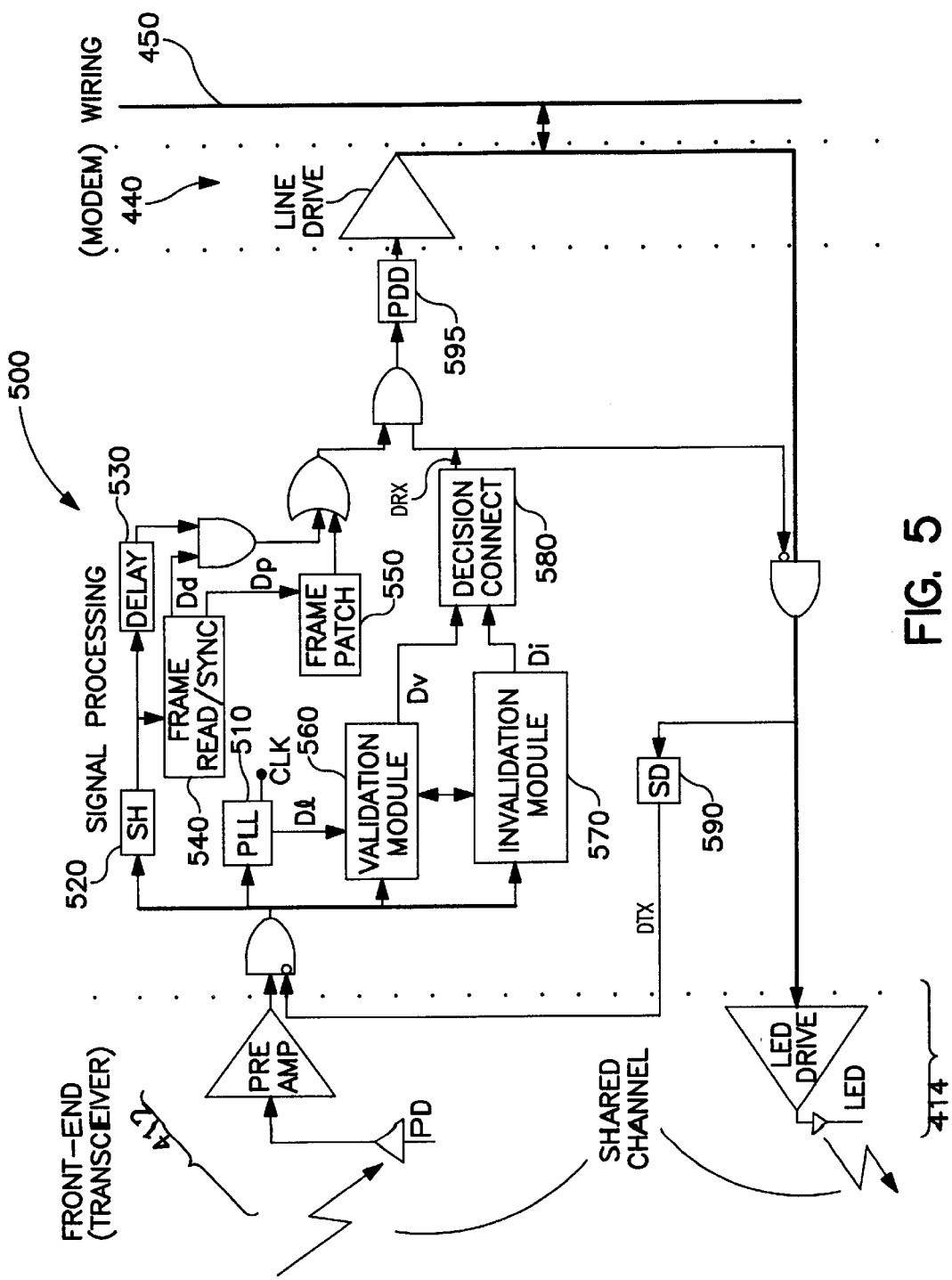
FIG. 5 is a block diagram of a single channel repeater in accordance with an exemplary embodiment of the present invention.

FIG. 5 shows a repeater 500 according to an exemplary embodiment of the invention. The repeater 500 includes a transmitter 414 and a receiver 412 that transmit wireless signals and receive wireless signals on a shared channel. A clock generator 510 generates a clock signal that may be used throughout the repeater 500. In a preferred embodiment, the clock generator 510 is a phase locked loop (PLL). The repeater 500 may regenerate a portion of a received signal that is lost before the clock generator 510 has synchronized to the incoming signal. The repeater 500 also may store signal components for later retransmission after an incoming signal is determined to be a valid signal.

The S/H or sampling module 520 samples the wireless signal received from the receiver 412 and regenerates the signal. In a preferred embodiment, the S/H module is an analog-to-digital converter. The delay module 530 receives the regenerated signal from the sampling module 520 and delays the received signal. The delay module 530 delays the received signal for a period of time governed by the larger of the following two time durations (measured from the beginning of the preamble): a) the time it would take the frame read/sync (FRS) module 540 (described below) to find the frame reference position and b) the longest time it would take for the validation/invalidation circuit combination to determine if a signal is valid.

The FRS module 540 extracts information from the frame header. For example, the FRS module 540 may extract frame length, type, and encoding information. The FRS module 540 also looks for a timing reference position in the beginning of the frame to trigger the frame patch module 550. When the timing reference position of the frame is detected, the restoration signal Dr is activated which triggers the start of the patching process in the frame patch module 550. The patching process takes place while Dr is activated. The patching is terminated when Dr is deactivated. When Dr is deactivated, the signal from the delay module 530 is output by activating Dd.

The frame patch module 550 contains a sequence of the frame which is expected to be lost between when frame receipt begins and when the clock generator 510 provides a clock signal. For example, this sequence could be the preamble of a frame, or the preamble plus the synchronization word. When the frame patch module 550 detects an activated restoration signal Dr from the FRS module 540 it immediately starts to clock out the stored sequence.

A frame received by the receiver is not retransmitted onto the wiring infrastructure 450 unless it is determined to be a valid signal. A valid signal is one deemed to be valid by the validation module 560 and deemed not to be invalid by the invalidation module 570.

The validation circuit or module 560 determines whether a signal received by the receiver 412 is valid. In a preferred embodiment, while the validation module 560 determines whether a signal is valid, the delay module 530 buffers the received signal. Preferably, during the validation process, the buffer output is disconnected from the modem 440. Preferably, after the validation module 560 has determined that a signal is valid, and the invalidation module 560 does not determine the signal to be invalid, it reconnects the buffer output to the modem 440.

The validation module may determine whether a signal is valid by performing a frequency analysis of the signal. The validation module takes a time Tv to determine whether a signal is valid. The time Tv is a design parameter to be considered when designing a wireless communication system since a shorter Tv may result in higher system throughput. Preferably, the time Tv is of the order of seconds. To do proper frequency analysis requires signal sequences in the order of milliseconds. Components for frequency analysis are also commonly quite costly.

An alternative solution for the validation module 560 to determine if a signal is valid is to use a signal recognition circuit which samples the incoming signal at a frequency equal to the signal's chip rate (i.e., the inverse of the PPM slot time). The validation module 560 can then count the number of high samples and the low samples. If the ratio of low samples to high samples is below a threshold value, the signal is deemed not to be valid. This alternative solution may be used, for example, where the preamble of a frame is a long periodic sequence such as . . . 10101010 . . . If the signal is deemed valid, the validation module 560 activates a signal Dv.

The validation module 560 may also have the capability of correlating a signal with a known signal sequence. This may be accomplished, for example, by convoluting the two signals and evaluating the result, as is well known in the art.

The validation module 560 may incorrectly deem a signal to be valid due the presence of a noise source, for example. The validation module 560 may also deem a noise source to be valid when no actual signal is being transmitted to the repeater 500. The invalidation circuit or module 570 operates in parallel with the validation module 560. The invalidation module 570 may prevent signal retransmission by the repeater 500 even if the validation module 560 incorrectly deems a signal valid The invalidation module 570 determines whether a signal is invalid. The invalidation module 570 may detect undesired signal components which are known not to be present in a valid signal and compares the strength of these undesired signal components to the strength of the true signal components. If the ratio of the strength of undesired signal components to the strength of valid signal components is above a predetermined threshold, the invalidation module 570 prevents retransmission of a signal by activating a signal Di.

In a preferred embodiment, the ratio of undesired signal components to true signal components is determined by counting the number of 1's and 0's in the signal. For example, when a signal is modulated using analog 4-PPM (pulse position modulation), if there are no PPM symbol errors, the ratio of 0's to 1's desirably should be exactly 3:1. The ratio of 0's to 1's in a preamble may be 1:1 for a valid signal whereas in the remainder of the frame the ratio is 3:1. The ratio of 0's to 1's in random noise may also be 1:2 if the sampling level of the S/M circuit is about 35%. Preferably, the wireless signals are modulated so the ratio of 0's to 1's of a modulated true signal is not 1:1.

Figure 6:
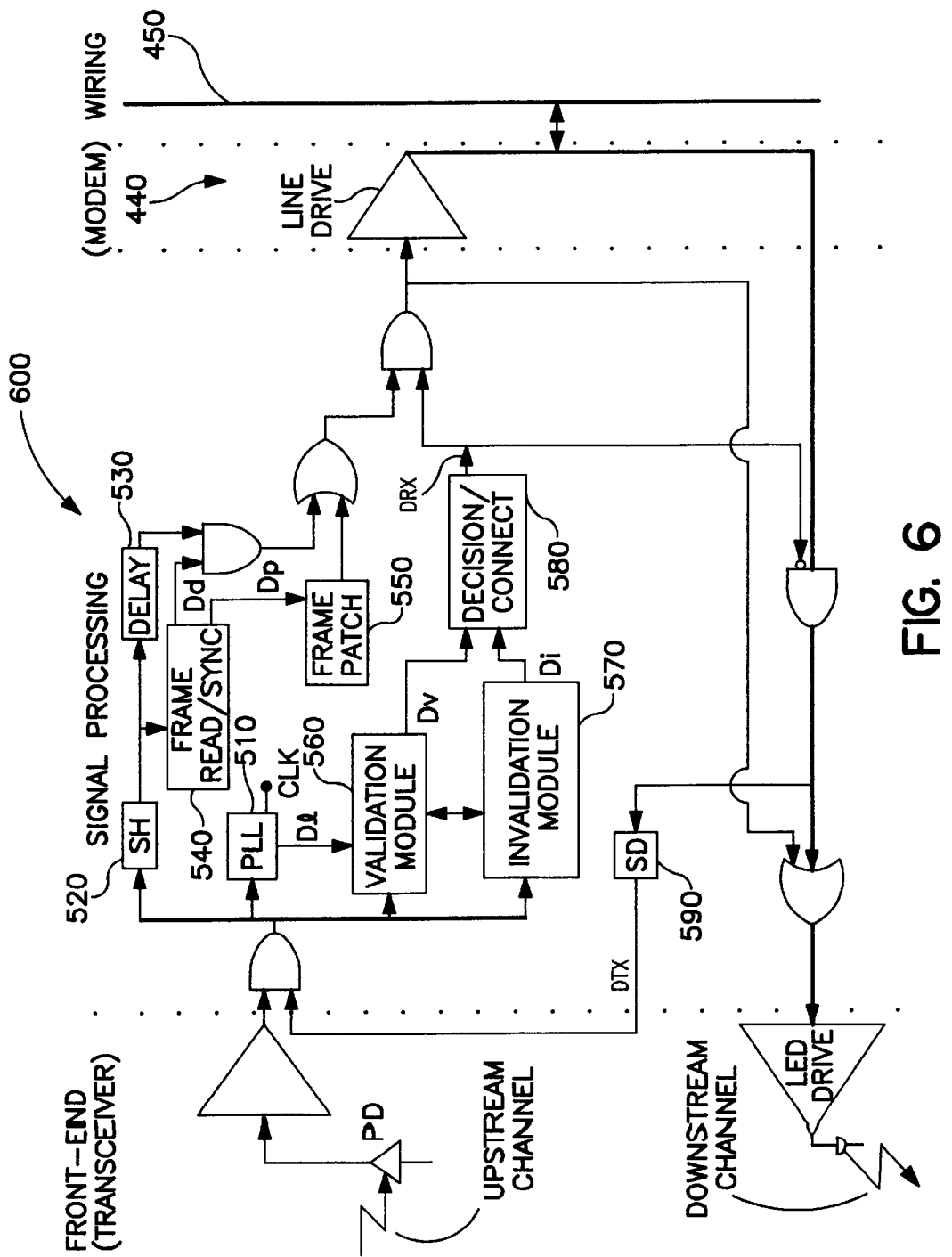
FIG. 6 is a block diagram of a dual channel repeater in accordance with an exemplary embodiment of the present invention.
Figure 7:
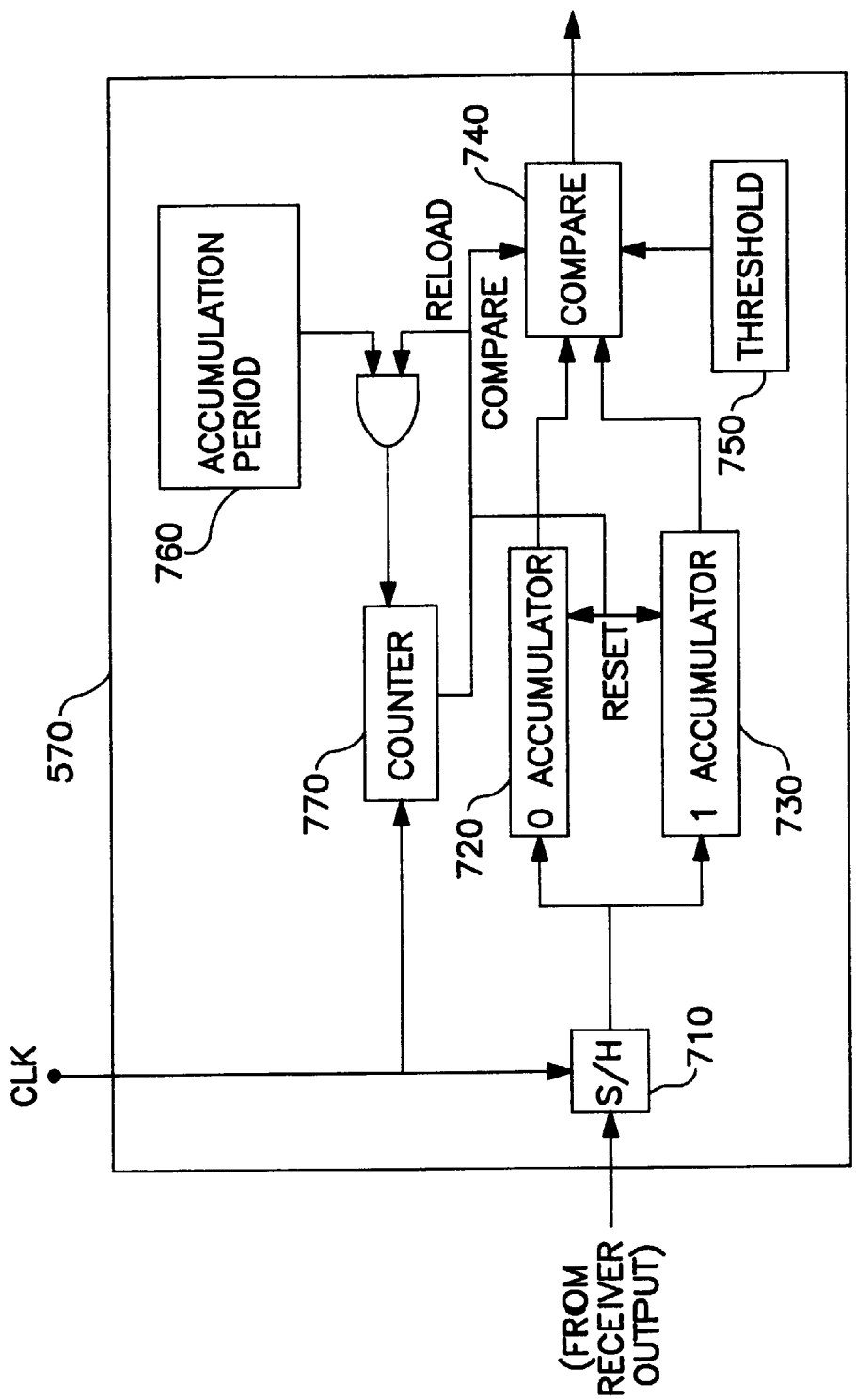
FIG. 7 is a block diagram of an invalidation module in accordance with an exemplary embodiment of the present invention.

FIG. 7 shows an exemplary block diagram of an invalidation module 570 that determines whether a signal is invalid by counting 0's and 1's. The S/H module 710 samples the wireless signal received by the receiver 412. The S/H module 710 may be the same module as the S/H module 520 in FIGS. 5 and 6. The 0 accumulator 720 counts 0's. The 1 accumulator 730 counts 1's. The compare module 740 compares the ratio of 0's to 1's to a value provided by the threshold module 750.

Preferably, the ratio of 0's to 1's will be calculated over a sufficient time to reduce errors due to statistical variations. The accumulation period module 760 provides the counter 770 with a count indicating the total number of 0 and 1 samples to be counted. Each time the counter module expires, the compare module 740 compares the current ratio of accumulated values of 0's and 1's to the content of the threshold module 750 and determines if the ratio is greater or smaller than the threshold value. In addition, each time the counter 770 expires, the accumulators 720, 730 are reset and the accumulation period is reloaded into the counter 770.

In a preferred embodiment, in addition to ensuring that the validation module 560 has not erroneously deemed a signal to be valid, the invalidation module 570 also determines if a valid signal is no longer present at the receiver 412. In an exemplary embodiment, the invalidation module 570 also determines when the output from the receiver should be disconnected from the modem by detecting when a true signal is no longer present.

The clock generator 510 may unlock from synchronization when a true signal is no longer present. Using this feature to detect an absence of a true signal may take longer than the invalidation module 570 to perform the same function.

An alternative for detecting the end of a frame is for the invalidation module 570 to look for an inverted synchronization sequence at the end of a frame. This alternative may be more accurate in determining the end of a frame but may take longer due to the duration of the synchronization sequence. In addition, this may require a modification of the frame format.

In addition to determining whether a signal is valid, the validation module 560 may be used to detect the start of a frame. Thus, the validation module 560 may indicate to the invalidation module 570 when to begin checking for invalid signal components. The invalidation module 570 detects the end of a frame and resets the validation module 560 so it can begin detecting the start of another frame.

The decision/connection module 580 connects the received signal to the modem when a valid signal is present. A signal is deemed to be a valid signal if deemed valid by the validation module 560 and not invalid by the invalidation module 570. If an invalid signal is detected by the invalidation module 570 after the received signal has been coupled to the modem 440, the decision/connect module 580 will disconnect the received signal from the modem 440.

The signal detect (SD) module 590 detects whether a signal is present on the wiring infrastructure 450. When a signal is present on the wiring infrastructure 450, the SD module 590 asserts the Dtx signal to uncouple the upstream processing unit from the receiver 412, thus blocking the upstream path. When a wireless signal is received by the receiver 412, if the signal is authentic the decision/connect module 580 disables the input to the transmitter 414 by asserting the Drx signal. The input to the transmitter 414 is disabled unless the output from the receiver 412 has already been disabled and vice-versa.

Figure 1:
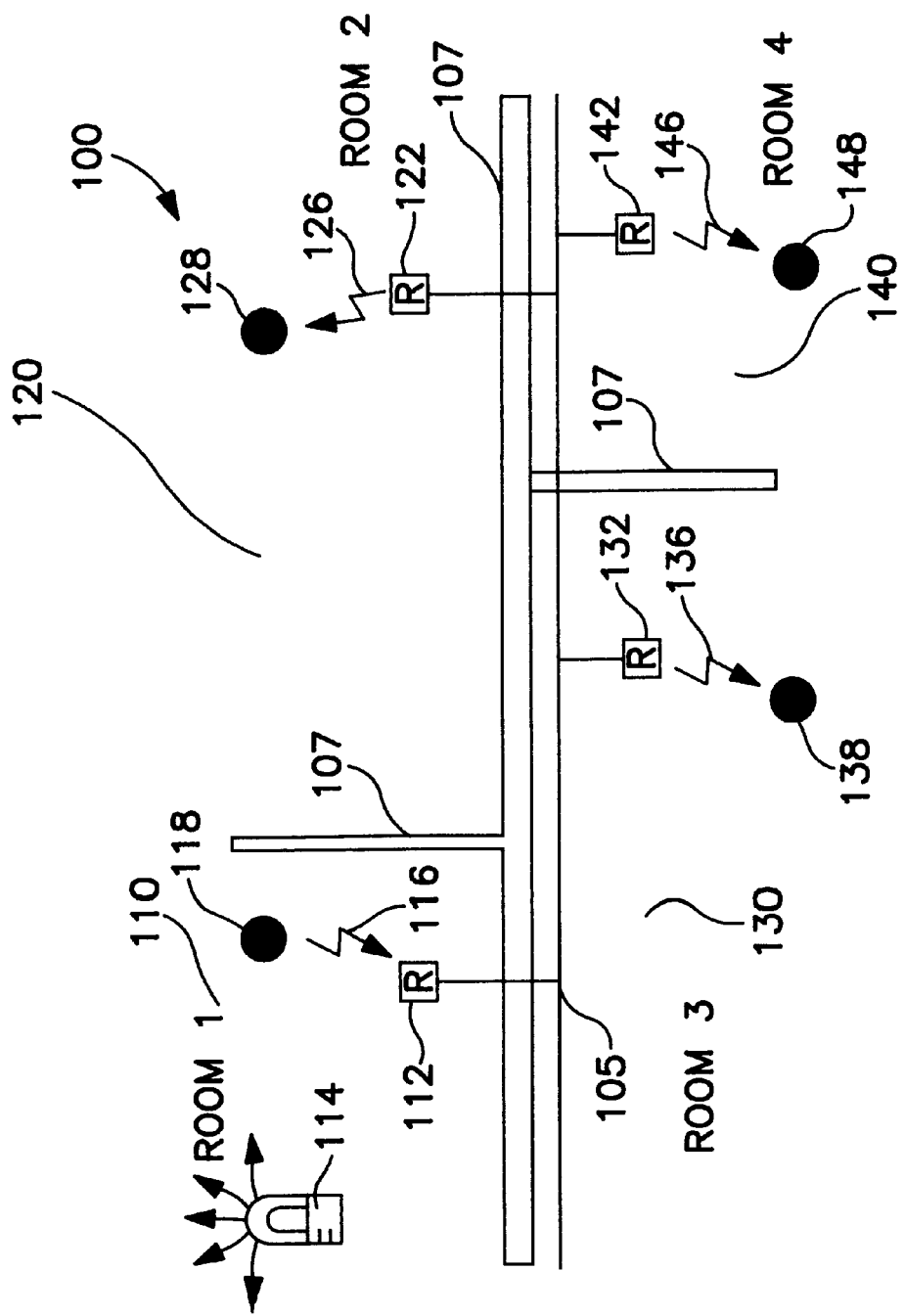
FIG. 1 illustrates a wireless communication system having a common wiring infrastructure.
Figure 2:
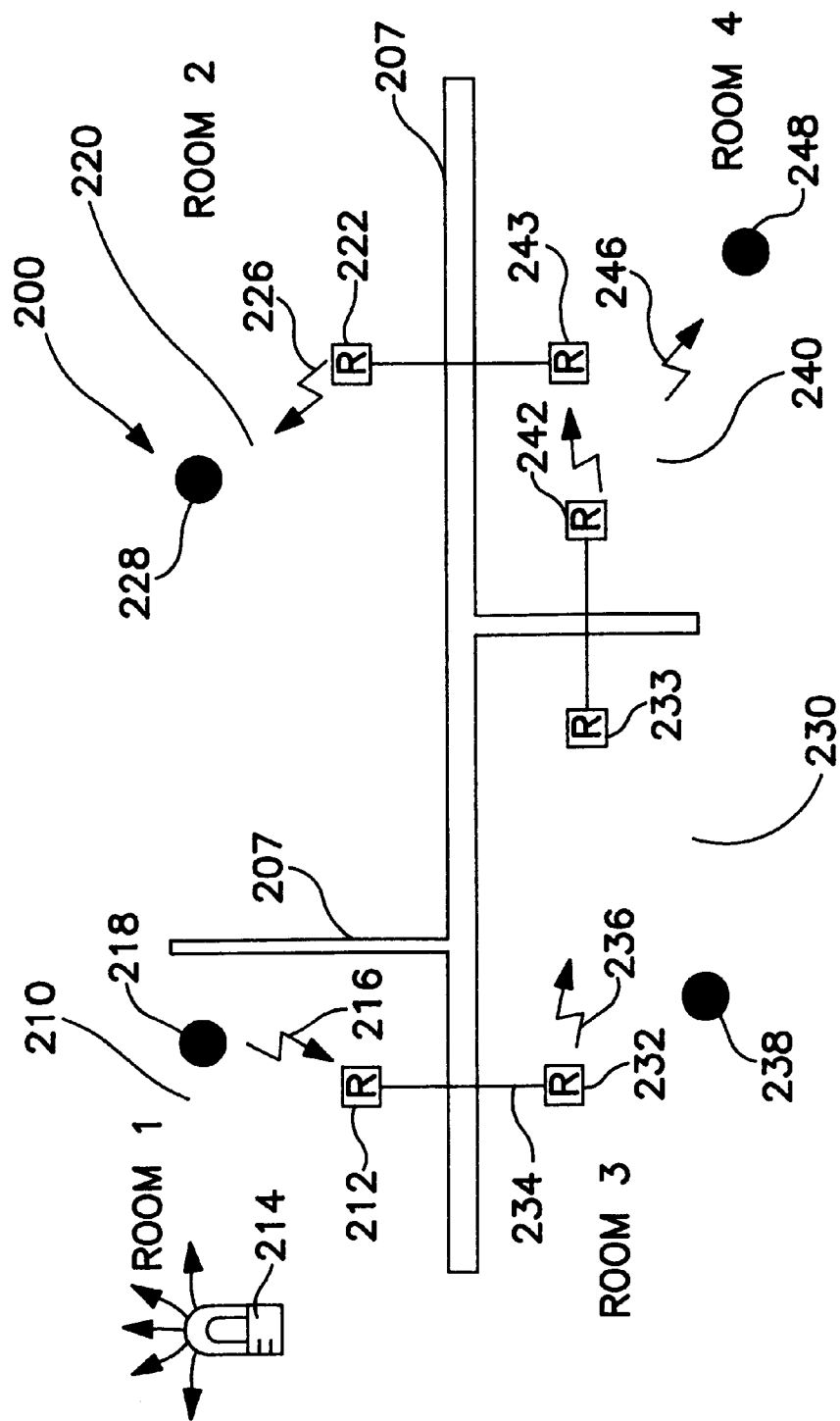
FIG. 2 illustrates a point-to-point wireless communication system.
Figure 3:
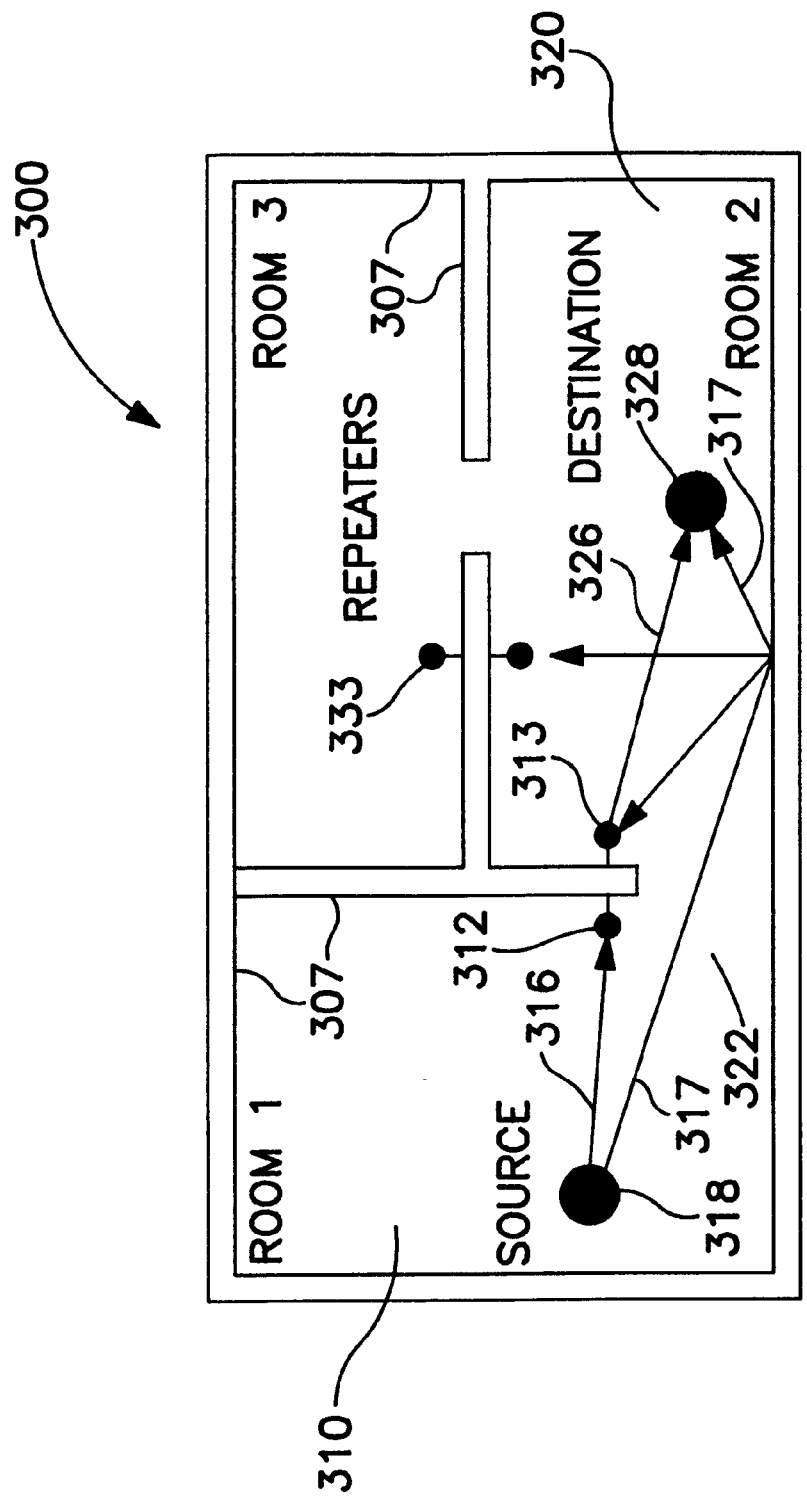
FIG. 3 illustrates the transmission and reception of signals that may cause self-distortion in a wireless communication system.

The repeater 500 shown in FIG. 5 transmits and receives wireless signals on a single channel. As discussed above, a single channel repeater may cause self-distortion due to multiple-path reception of the same signal. The PDD module 595 delays the upstream signal processing unit to reduce the likelihood of self-distortion. Preferably, the time of delay is the maximum expected difference in propagation delay between the direct path from the source wireless station 318 in FIG. 3 to the repeater 312 in the first room 310 and the reflected path following the third signal path 317.

The PDD module 595 may only be effective in cases where both or neither the repeater 313 and destination wireless station 328 detect the reflected signal. For example, when the repeater detects the reflected signal and the destination wireless station does not detect the reflected signal, the repeater does not retransmit the signal and the destination wireless station receives neither the reflected nor a regenerated signal.

In another exemplary embodiment, self-distortion is avoided by using one channel for upstream signal (i.e., from wireless station to repeater) and another channel for downstream signals (i.e., from repeater to wireless station). FIG. 6 illustrates a repeater 600 according to an exemplary embodiment of the present invention that uses separate channels to transmit and receive wireless signals. Note that a PDD module 595 may not be necessary since a transmitted signal from a source wireless station can not be received by a destination wireless station. A signal may be transmitted by a source wireless station on one channel, received by a repeater, and then retransmitted on another channel upon which the destination wireless station receives the signal.

The repeater 600 also differs from the single channel repeater 500 by immediately reflecting a valid received wireless signal back into the same room from which it was received. This may be necessary since two wireless stations in the same room may not communicate with each other without a repeater since they transmit and receive on separate channels.

In a preferred embodiment, a repeater operates in a simplex mode by only allowing one signal to pass through it at a time. The teachings of the present invention are not limited to communication systems using a particular MAC protocol, although the protocol of a communication system using a repeater according to the present invention preferably accommodates a propagation delay imposed by the repeater.

The teachings of this invention are not limited to application in IR wireless communication systems and may be applied to other wireless communication system.

A collision on the wiring infrastructure 450 may be caused by two wireless stations in two different rooms transmitting signals simultaneously. One of ordinary skill in the art may use the teachings of the present invention to also evaluate the signal received from a wiring infrastructure 450 to determine whether it is a valid signal before retransmission as a wireless signal. This may confine collisions on the wiring infrastructure 450 to the wiring infrastructure 450 by not retransmitting a collision on the wiring infrastructure 450.

The present invention was described above with reference to a dedicated wiring infrastructure 450. As known to those skilled in the art, the teachings of the present invention may be applied to a communication system using a shared wiring infrastructure 450, such as a telephone wiring system or power wiring system or another wireless system.

The repeater according to the present invention is a physical layer solution, thus reducing cost, complexity, and signal delay. The repeater may also avoid self-distortion by using separate channels to transmit and receive wireless signals or by delaying signal retransmission.

The repeater according to the present invention may be implemented in many wireless communication system topologies as known to those skilled in the art, including a point-to-point topology and a common wiring infrastructure topology.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A repeater comprising:
   receiving means for receiving a first signal from a first medium;
   validation means for determining whether a signature is present in said first signal said validation means comprising:

sampling means for sampling said first signal for a predetermined duration;

first counting means for counting a number of samples of said first signal at one signal level;

second counting means for counting a number of samples of said first signal at another signal level;

comparing means for comparing the number of samples at said one signal level to the number of samples at said another signal level; and correlating means for ensuring that said samples at said one signal level and said samples at said another signal level alternate;

invalidation means for determining whether undesired signal components are present in said signal;

communication means for transmitting said first signal to a second medium if said signature is present and if said undesired signal components are not present; and transmitting means for transmitting a second signal received from said second medium to said first medium.

2. The repeater according to claim 1 wherein:
said validation means determines whether said first signal is valid; and
said invalidation means determines whether said first signal is invalid.

3. The repeater according to claim 1 further comprising means for delaying said transmitted first signal.

4. The repeater according to claim 1 wherein said receiving means and said transmitting means use a shared channel.

5. The repeater according to claim 1 wherein said receiving means communicates on a first channel and said transmitting means communicates on a second channel.

6. The repeater according to claim 1 wherein:
said signal includes frames;
said validation means identifies the beginning of one of said frames; and
said invalidation means identifies the end of said one of said frames.

7. The repeater according to claim 1, wherein said first signal is retransmitted back into said first medium by transmitting said first signal into said second medium to another repeater wherein said another repeater transmits said signal into said first medium.

8. The repeater according to claim 7, wherein said signal is transmitted to another repeater over a wire-like medium.

9. The repeater according to claim 1, wherein said first medium is an infrared wireless medium.

10. The repeater according to claim 1, wherein said communication means is further for receiving said second signal from said second medium.

11. The repeater according to claim 1, wherein said validation means and said invalidation means disables said transmitting means from transmitting said second signal to said first medium if said validation means determines that said first signal is valid and said invalidation means determines that said first signal is not invalid.

12. The repeater according to claim 1, wherein said transmitting means disables said communication means from transmitting said first signal to said second medium if said second signal is present at said transmitting means.

13. A repeater comprising:
receiving means for receiving a first signal from a first medium;
invalidation means for determining whether undesired signal components are present in said signal;
wherein the invalidation means comprises:
sampling means for sampling said first signal for a predetermined duration;
first counting means for counting a number of samples of said first signal at one signal level;
second counting means for counting a number of samples of said second signal at another signal level;
calculating means for calculating a ratio of the number of samples at said one signal level to the number of samples at said another signal level; and
comparing means for comparing the ratio to a predetermined threshold;

communication means for transmitting said first signal to a second medium if said signature is present and if said undesired signal components are not present; and transmitting means for transmitting a second signal received from said second medium to said first medium.

14. A repeater comprising:
receiving means for receiving a first signal from a first medium;
validation means for determining whether a signature is present in said first signal;
invalidation means for determining whether undesired signal components are present in said signal;
wherein said invalidation means comprises:
means for determining a signal strength of said undesired signal components;
validation means for determining whether a signature is present in said first signal;
communication means for transmitting said first signal to a second medium if said signature is present and if said undesired signal components are not present; and
transmitting means for transmitting a second signal received from said second medium to said first medium;
said validation means comprises:
means for determining a signal strength of desired signal components; and
said repeater further comprises:
means for generating a ratio of said signal strength of said undesired signal components to said signal strength of said desired signal components; and
means for comparing said ratio to a predetermined threshold.

15. A method of regenerating a signal comprising the steps of:
(a) receiving said signal;
(b) determining whether a signature is present in said signal by performing the steps of:
(i) sampling said signal for a predetermined duration;
(ii) counting a number of samples at one signal level;
(iii) counting a number of samples at another signal level;
(iv) comparing the number of samples at said one signal level to the number of samples at said another signal level; and
(v) ensuring that said samples at said one signal level and said samples at said another signal level alternate;

(c) determining whether undesired signal components are present in said signal; and (d) transmitting said signal if said signature is present and if said undesired signal components are not present.

16. A method of regenerating a signal according to claim 15 wherein:

step (b) further comprises the step of determining whether said signal is valid; and step (c) further comprises the step of determining whether said signal is invalid.

17. A method of regenerating a signal according to claim 15 wherein step (b) comprises the following steps:

(i) sampling said signal for a predetermined duration;

(ii) counting a number of samples at one signal level;

(iii) counting a number of samples at another signal level;

(iv) comparing the number of samples at said one signal level to the number of samples at said another signal level; and (v) ensuring that said samples at said one signal level and said samples at said another signal level alternate.

18. A method of regenerating a signal according to claim 16 wherein step (d) further comprises the step of delaying said signal before transmitting said signal.

19. A method of regenerating a signal according to claim 15 wherein said signal is received and a further signal is transmitted on the same channel.

20. A method of regenerating a signal according to claim 15 wherein said signal is received on a first channel and a further signal is transmitted on a second channel.

21. A method of regenerating a signal according to claim 15 wherein said signal includes frames and step (b) further comprises the step of identifying the beginning of one of said frames and step (c) further comprises the step of identifying the end of said one of said frames.

22. A method of regenerating a signal comprising the stops of:

(a) receiving said signal;

(b) determining whether a signature is present in said signal;

(c) determining whether undesired signal components are present in said signal;

(i) sampling said signal for a predetermined duration;

(ii) counting a number of samples at one signal level;

(iii) counting a number of samples at another signal level;

(iv) calculating the ratio of the number of samples at said one signal level to the number of samples at said another signal level; and (v) comparing the ratio to a predetermined threshold and (d) transmitting said signal if said signature is present and if said undesired signal components are not present.

23. A method of regenerating a signal comprising the steps of:

(a) receiving said signal;

(b) determining whether a signature is present in said signal;

(c) determining whether undesired signal components are present in said signal;

(d) transmitting said signal if said signature is present and if said undesired signal components are not present (e) determining a signal strength of said undesired signal components;

(f) determining a signal strength of desired signal components; and (g) generating a ratio of said signal strength of said undesired signal components to said signal strength of said desired signal components; and (h) comparing said ratio to a predetermined threshold.

* * * * *